United States Patent [19]

Kitamori et al.

[11] Patent Number: 4,751,415
[45] Date of Patent: Jun. 14, 1988

[54] BRUSHLESS DC MOTOR WITH MEANS FOR COMPENSATING RIPPLE TORQUE

[75] Inventors: Teruaki Kitamori, Hirakata; Sotoo Asano, Katano, both of Japan

[73] Assignee: Matsushita Electric Industrial Co., Ltd., Kadoma, Japan

[21] Appl. No.: 44,018

[22] Filed: Apr. 28, 1987

[51] Int. Cl.$^4$ .................... H02K 11/00; H02K 29/08
[52] U.S. Cl. ................... 310/156; 310/68 R; 310/186; 318/254
[58] Field of Search .............. 310/67 R, 46, 68 R, 310/72, 160, 169, 170, 186, 187, 188, 268, 156; 318/114, 138, 254

[56] References Cited

U.S. PATENT DOCUMENTS

| | | | |
|---|---|---|---|
| 3,873,897 | 3/1975 | Muller | 318/138 |
| 3,873,898 | 3/1975 | Müller | 318/254 |
| 4,211,963 | 7/1980 | Muller | 318/254 |
| 4,260,920 | 4/1981 | Nakamura et al. | 310/156 |
| 4,704,566 | 11/1987 | Hirano et al. | 318/138 |
| 4,704,567 | 11/1987 | Suzuki et al. | 318/138 |

OTHER PUBLICATIONS

"2-Phase Transistor Motor" by Kitamori, Tanaka and Yamada, National Technical Report, vol. 26, No. 5 (Oct. 1980) pp. 794 to 800.

Primary Examiner—Patrick R. Salce
Assistant Examiner—D. L. Rebsch
Attorney, Agent, or Firm—Cushman, Darby & Cushman

[57] ABSTRACT

A brushless DC motor comprising a stator with plural exciting windings and a rotor made of a permanent magnet is provided with a compensation winding wound in the stator and compensation magnetic poles disposed on the rotor such that a torque which is generated between the compensation winding and the compensation magnetic poles of the rotor may eliminate fluctuation of the torque generated by interaction of the exciting windings of the stator and the main magnet of the rotor.

5 Claims, 9 Drawing Sheets

BRUSHLESS DC MOTOR WITH MEANS FOR COMPENSATING RIPPLE TORQUE

FIELD OF THE INVENTION AND RELATED ART STATEMENT

1. Field of the Invention

The present invention relates to a brushless DC motor which is suitable for a laser printer, a polygon scanner for facsimile or the like.

2. Description of the Related Art

The conventional brushless DC motor in the prior art is provided with exciting multiphase windings with semiconductor switches connected to the respective exciting windings, wherein the direction of current flowing in the exciting windings is switched in response to the relative position between a rotor made of a permanent magnet and the exciting windings. By changing the current direction and by selecting suitable windings, a torque for a constant rotative direction is generated. However, in such a brushless DC motor of the prior art, when the currents of the windings are switched for selection of the windings, a discontinuous fluctuation of the torque which is peculiar to the conventional brushless DC motor arises. In order to reduce the peculiar fluctuation of the torque, it is desirable, for example, to increase the inertia of the rotative member or to control the phase and the value of the exciting current with a driving circuit, so as to compensate the fluctuation of the torque.

Figure 8:
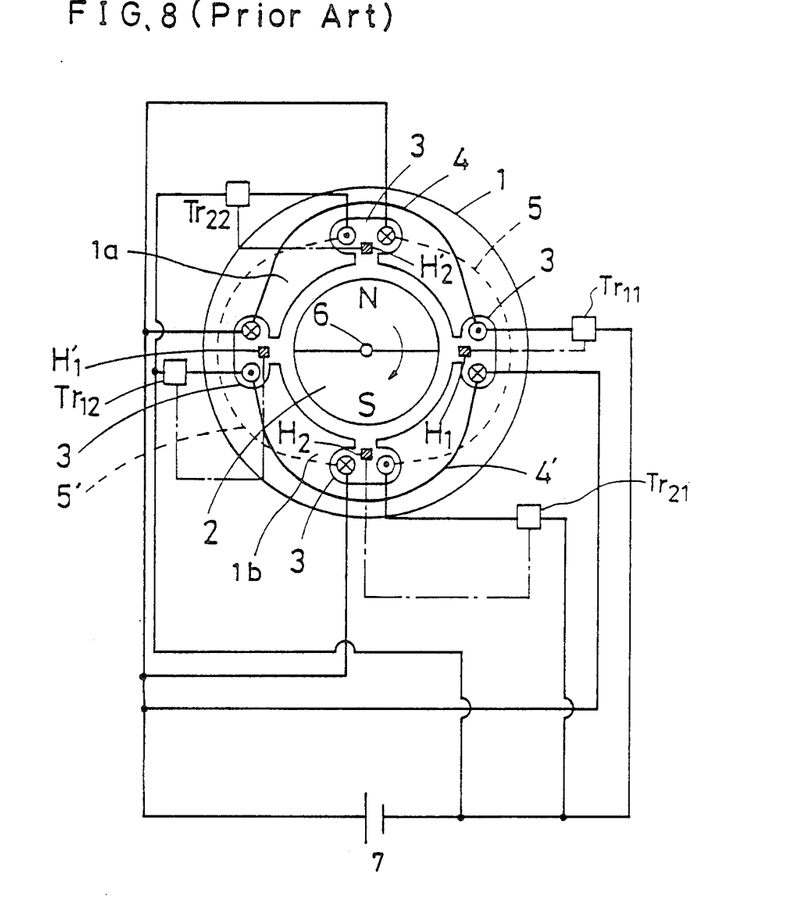
FIG. 8 is the plan view of a brushless DC motor in the prior art.

A brushless DC motor which is equivalent to the two-phase excitation in alternating current and which is excited using a transistor switch is shown in FIG. 8 as a conventional example in the prior art. Referring to FIG. 8, a stator 1 is provided with four slots 3, and exciting windings 4, 4', 5 and 5' are wound in the respective slots 3. A rotor 2 which is magnetized into two poles of N and S is rotatably mounted in the central opening of the stator 1 with the shaft 6. Although a rotor 2 having one pole pair is shown by way of Example in the related art description for simplicity, the electric angle of a unit pole pair will be $2\pi$ even if the rotor has multipole pairs.

Respective direct current switches $Tr_{11}$, $Tr_{12}$, $Tr_{21}$ and $Tr_{22}$ are connected in series with the exciting windings 4, 4', 5 and 5', respectively. A positive terminal of a direct current power source 7 is connected to one end of the windings 4 and 4'. Another end of the windings 4 and 4' is connected to the negative terminal of the DC power source 7 through the respective DC current switches $Tr_{11}$ and $Tr_{12}$. Since the direct current switches $Tr_{11}$–$Tr_{22}$ allow a current to pass in a predetermined direction when closed, for example, when a current flows into the exciting winding 4 which is connected to the direct current switch $Tr_{11}$ by closing the direct current switch $Tr_{11}$, a portion 1a of the stator 1 wound with the exciting winding 4 is magnetized to N of the magnetic pole, which is identical with the N pole of the rotor 2. On the other hand, when the direct current switch $Tr_{12}$ closes, a current flows into the exciting winding 4', and a portion 1b of the stator 1 wound with the winding 4' is magnetized to the N pole. As a result, the magnetic pole of the portion 1a of the stator 1 wound by the exciting winding 4 becomes N by turning ON the direct current switch $Tr_{11}$, and becomes S by turning ON the direct current switch $Tr_{12}$. On the contrary, the magnetic pole of the portion 1b of the stator 1 wound with the exciting winding 4' becomes S by turning ON the direct current switch $Tr_{11}$, and becomes N by turning ON the direct current switch $Tr_{12}$. The changes of the magnetic poles as mentioned above are substantially identical with a change of magnetic poles of a single exciting winding in alternating current excitation. Effects which are caused by the exciting windings 5 and 5' and are respective direct current switches $Tr_{21}$ and $Tr_{22}$ are similar to that of the exciting windings 4 and 4' and the direct current switches $Tr_{11}$ and $Tr_{12}$. These effects are substantially equivalent to the two-phase excitation in the alternating current excitation.

Positional sensors $H_1$, $H_2$, $H_1'$ and $H_2'$ are disposed in the respective slots 3 and detect a position of the magnetic pole of the rotor 2. The respective positional sensors $H_1$, $H_2$, $H_1'$ and $H_2'$ are connected to the direct current switches $Tr_{11}$, $Tr_{21}$, $Tr_{12}$ and $Tr_{22}$, respectively. Signals for controlling the exciting windings 4, 4', 5 and 5' in relation to the magnetic pole of the rotor 2 are generated by the positional sensors $H_1$, $H_2$, $H_1'$, $H_2'$, respectively. The positional sensors $H_1$, $H_2$, $H_1'$ and $H_2'$ may be composed by a Hall device, for example. During operation of the positional sensors, when the N pole of the rotor 2 approaches the positional sensor $H_1$, a voltage is induced in the positional sensor $H_1$ and the direct current switch $Tr_{11}$ closes. By contrast, induced voltage in the positional sensor $H_1'$ is reduced and the direct current switch $Tr_{12}$ is opened. The above-mentioned action also arises in the positional sensors $H_2$ and $H_2'$ at the position wherein the rotor 2 turns by 90° from the positions mentioned above, and in this case the direct current switch $Tr_{21}$ closes and the direct current switch $Tr_{22}$ opens. As a result, the exciting windings 4, 4', 5 and 5' are switched in turn by rotation of the rotor 2 about shaft 6.

Figure 9A:
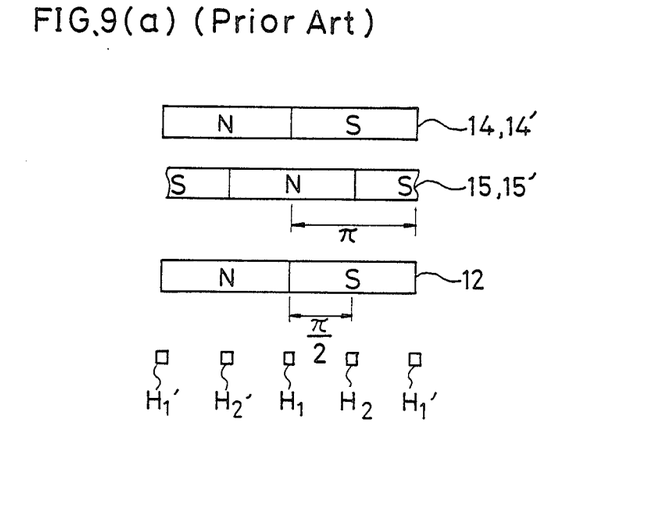
FIG. 9(a) shows the relative position of linearly spread magnetic poles of the stator and rotor and of the positional sensors in the prior art.

The relationship between the magnetic poles generated by the exciting windings 4, 4', 5 and 5' and the rotor 2 is shown in FIG. 9(a). In the figure, the magnetic poles of the stator 1 excited by the respective exciting windings 4, 4', 5 and 5' and the rotor 2 are shown by linearly spread bars. Referring to FIG. 9(a), the magnetic poles 14 and 14' of the stator 1 excited by the exciting windings 4 and 4' coincide with the magnetic poles 12 of the rotor 2, which are shown in the third line of FIG. 9(a). In this state, on the other hand, the magnetic poles 15 and 15' of the stator 1 excited by the exciting windings 5 and 5' are displaced from the magnetic poles 12 of the rotor 2 by $\pi/2$ as shown in the middle line of FIG. 9(a). The positions of the respective positional sensors $H_1$, $H_2$, $H_1'$ and $H_2'$ are as shown at the bottom line.

Figure 9B:
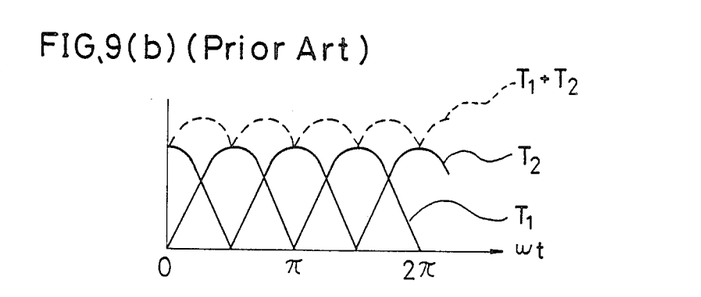
FIG. 9(b) shows the torque characteristics of the brushless DC motor in the prior art.

A variation of the torque corresponding to the rotational angle of the rotor 2 is shown in the waveforms of FIG. 9(b). A waveform $T_1$ shows a torque generated by the magnetic poles 14 and 14', and a waveform $T_2$ shows a torque generated by the magnetic poles 15 and 15'. A waveform $(T_1+T_2)$ shows a resultant torque of the magnetic poles 14, 14', 15 and 15'. The waveform $(T_1+T_2)$ shows that the exciting windings 4, 4', 5 and 5' are switched during the rotational angle of $\pi$ of the rotor 2. Furthermore, it is shown that the phase difference between the exciting windings 4 and 4' and the exciting windings 5 and 5' is $\pi/2$. The above-mentioned operation is known as the current flowing for a $\pi$ electric degrees in the brushless motor.

When the gap between stator 1 and rotor 2 is uniform and a reluctance torque does not exist, and when the windings are simply excited by a switched DC source, the excited magnetic flux distribution of the stator 1 per one unit length of axis direction is shown by the following expression:

$$B_s \sin \theta,$$

and a magnetic flux distribution of the rotor magnet per one unit length for axial direction is shown by the following expression:

$$B_R \sin(\theta - \omega t - \psi),$$

where $\theta$ designates a space distribution angle, $B_s$ designates a maximum value of excited magnetic distribution, $\omega t$ designates an angular velocity of rotation, $B_R$ designates a maximum value of a magnetic flux distribution of the rotor and $\psi$ designates an initial difference of positions or a load angle between the stator 1 and the rotor 2. A magnetic energy W which is stored in the gap is shown by the following equation (1):

$$W = \frac{1}{2}(B_S \sin\theta + B_R \sin(\theta - \omega t - \psi))^2 R, \quad (1)$$

where, R designates a reluctance.

Therefore, a torque T which is generated by exciting the respective exciting windings 4, 4', 5 and 5' is shown by the following equation (2):

$$\begin{aligned} T &= -\oint \frac{dW}{d(\omega t + \psi)} d\theta \\ &= -2\pi R B_S B_R \sin(\omega t + \psi). \end{aligned} \quad (2)$$

When a spatial harmonics magnetic flux distribution exists in the magnetic flux distribution, a torque Tn by the harmonics magnetic flux is generated only when the harmonic magnetic flux distribution of the same dimension exists as shown by the equations (1) and (2), the torque Tn being introduced by combination of the equation (1) and (2), and being shown by the following equation (3):

$$Tn = -2\pi Rn B_{Sn} B_{Rn} \sin n(\omega t + \psi) \quad (3),$$

where Bsn designates a maximum value of an excited magnetic flux distribution of an n harmonic, BRn designates a maximum value of an excited magnetic flux distribution of the rotor of an N harmonic and Rn designates the reluctance of an n harmonic.

In the above-mentioned operation, currents are continuously flowed in the exciting windings 4, 4', 5 and 5', and the flows of the currents are controlled by the positional sensors $H_1$, $H_1'$, $H_2$ and $H_2'$ for sensing the magnetic pole of the rotor 2. Therefore, the torque Tn between the magnetic poles 14, 14', 15 and 15' and the rotor 2 as shown in the equation (3) is maintained within the rotational angle from 0 to $\pi$ in the current flow for $\pi$ electric degrees.

Figure 10A:
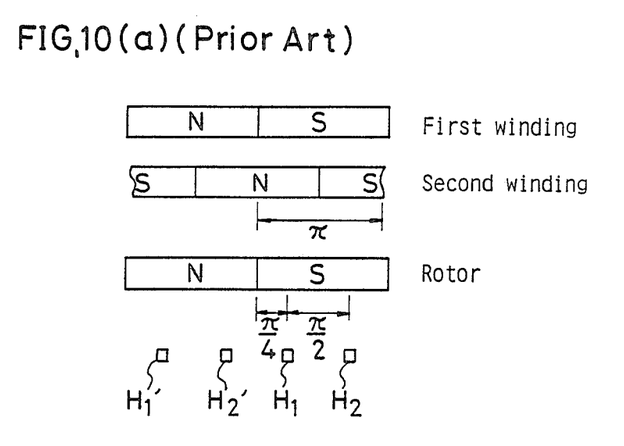
FIG. 10(a) shows the relative position of the linearly spread magnetic poles of the stator and rotor in $\pi/2$ operation of a two-phase motor in the prior art.
Figure 10B:
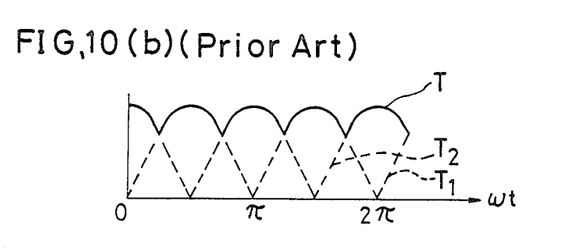
FIG. 10(b) shows the torque characteristics in current flow for $\pi/2$ electric degrees of a two-phase motor in the prior art.

In a brushless DC motor of the prior art comprising two-phase exciting windings and a rotor operating in the current flow for $\pi/2$ electric angle, as shown in FIG. 10(a), when one exciting winding is excited, another exciting winding is controlled so as not to be excited by utilizing the positional sensors $H_1$, $H_2$, $H_1'$ and $H_2'$. The exciting windings are excited with a time period of $\pi/2$ in turn. Therefore, in this prior art motor, the torque fluctuates with a time period of $\pi/2$ as shown by the curve T of FIG. 10(b), and there is a specialized torque variation in two-phase exciting of the current flow for $\pi/2$ electric degrees.

Figure 11A:
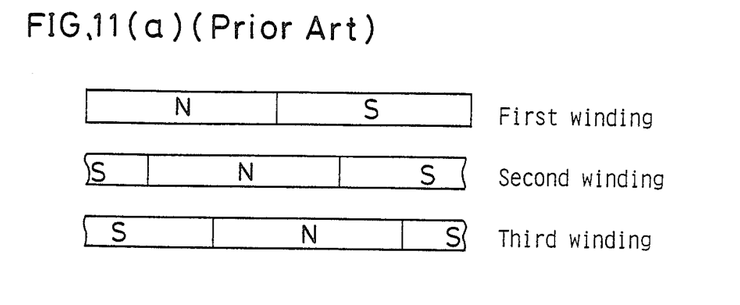
FIG. 11(a), FIG. 11(b) and FIG. 11(c) show the relative positions of the linearly spread magnetic poles of the stator and rotor and of the positional sensors in the three-phase operation of the prior art.
Figure 11B:
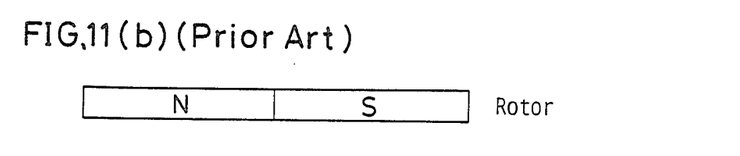
Figure 11C:
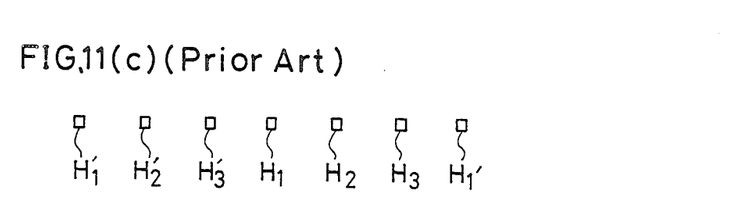
Figure 11D:
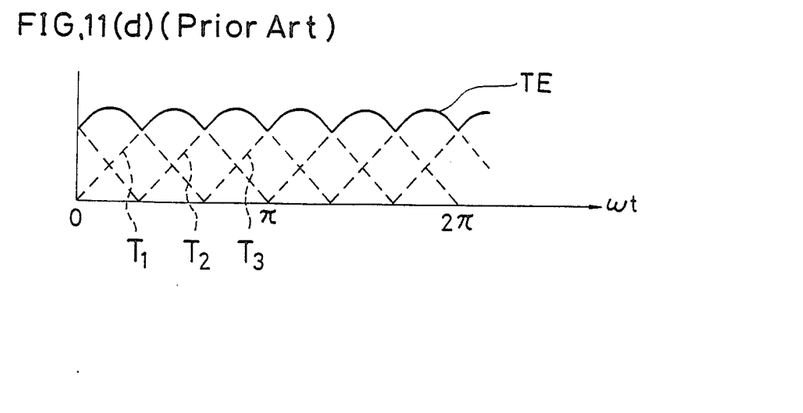
FIG. 11(d) shows the torque characteristic in the three-phase operation of the prior art.

FIG. 11(a)–FIG. 11(d) show an example of a brushless DC motor in the prior art having three-phase exciting windings. FIG. 11(a) shows exciting polarities of the respective exciting windings, and FIG. 11(b) shows the polarity of the rotor wherein the pole N of the rotor coincides with the polarity of the first windings. The positional sensors $H_1$, $H_2$, $H_3$, $H_1'$, $H_2'$ and $H_3'$ are disposed at the positions as shown in FIG. 11(c). The torque characteristic in the current flowing for $\pi/3$ electric degrees of the example is shown in FIG. 11(d). The torques $T_1$, $T_2$ and $T_3$ as shown by dotted lines are generated by the first winding, the second winding and the third winding, respectively. The sum torque is shown by the envelope TE. As is shown by the envelope TE, the torque of the three-phase brushless DC motor also considerably varies with an electric angle $\pi/3$ which is peculiar therein.

OBJECT AND SUMMARY OF THE INVENTION

An object of the present invention is to provide a brushless DC motor wherein fluctuation of the torque is reduced and a flat torque characteristic is realized.

The brushless DC motor for compensating ripple torque in accordance with the present invention comprises:

a stator having exciting windings, a rotor having main magnetic poles opposing the exciting windings through an air gap, compensation magnetic poles disposed on the rotor, and a compensation winding opposing through the air gap the compensation magnetic poles disposed on the rotor, for generating a compensating torque having inverse phase and an identical cyclic period with respect to a variation of torque generated by interaction of the exciting windings and the main magnetic poles.

DESCRIPTION OF THE PREFERRED EMBODIMENT

Figure 1:
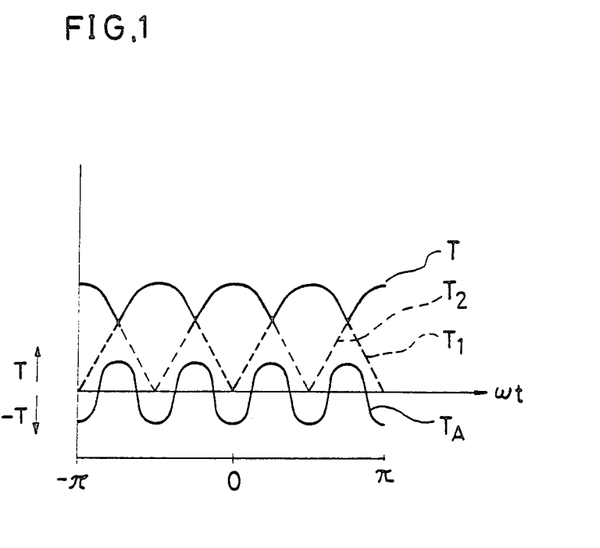
FIG. 1 is a graphics depiction of a main torque and a compensation torque in a brushless DC motor of a first embodiment in accordance with the present invention.

An embodiment of the present invention is illustrated in FIG. 1-FIG. 7(d). The basic principle of the present invention is shown in FIG. 1. Referring to FIG. 1, the abscissa indicates a rotational angle represented in radians and the ordinate indicates torque. Curve $T_1$ shows a torque generated between first windings 8 and 8' and a rotor 2, and curve $T_2$ shows the torque generated between second winding 9 and 9' and the rotor 2. Curve T, which is an envelope of the curves $T_1$ and $T_2$, shows a sum of the torques as shown by the curves $T_1$ and $T_2$ in a current flowing for $\pi/2$ electric degrees of a two-phase brushless DC motor. The above-mentioned torque T cyclically varies with a time period of $\pi/2$. If a compensation torque as shown by a curve $T_A$ is added to the torque T, hill-top shaped portions of the compensation torque $T_A$ are added to valley-shaped portions of the torque T, and total torque becomes almost flat because the phase of the compensation torque $T_A$ is opposite to that of the torque T and effectively eliminates the hill and vally-shaped portions when added thereto.

Figure 2:
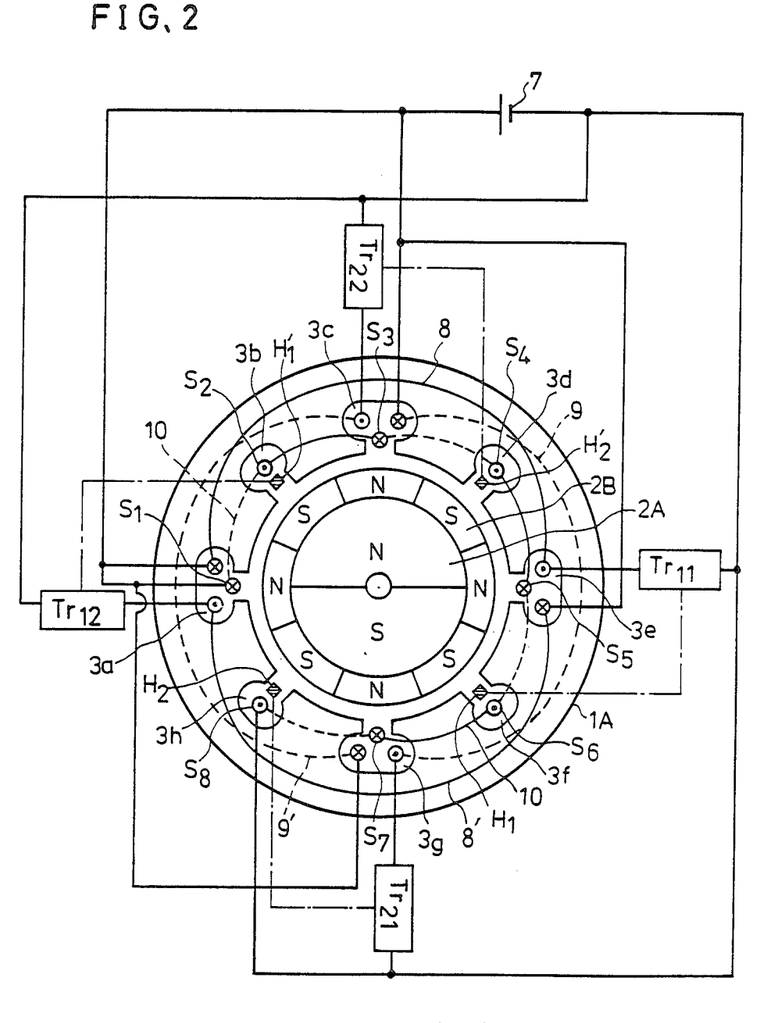
FIG. 2 is a plane view of the brushless DC motor of the first embodiment.

A plane view of an embodiment in accordance with the present invention is shown in FIG. 2. A ring shaped stator core 1A has eight slots 3a, 3b, 3c, 3d, 3e, 3f, 3g and 3h on an inner wall thereof. A winding 8 is wound across slots 3a and 3e on the upper portion of the stator core 1A as shown in FIG. 2. A winding 8' is wound also across the slot 3a and 3e on the lower part of the stator core 1A. A winding 9 is wound across slots 3c and 3g on the right portion of the stator core 1A, and a winding 9' is wound acros the slots 3c and 3g on the left portion of the stator 1A. A compensation winding 10 is also inserted in the slot 3a from the front side to the rear side of the stator 1A as shown in FIG. 2. Compensation winding 10 passes behind the stator 1A and is inserted in the slot 3b. Then the winding 10 is pulled out to the front side of the stator 1A. Subsequently, the winding 10 passes the front side of the stator 1A and is inserted in the slot 3c to the rear side of the stator 1A. The remainder of the slots 3d, 3e, 3f, 3g and 3h are likewise filled by the winding 10, and the respective terminals are connected to the power source 7.

One of the terminals of each of the windings 8 and 8' are connected to a negative terminal of a power source 7 through direct current switches $Tr_{11}$ and $Tr_{12}$, respectively. One of the terminals of each of the winding 9 and 9' is also connected to the negative terminal of the power source 7 through direct current switches $Tr_{21}$ and $Tr_{22}$. The other terminals of the respective windings 8, 8', 9 and 9' are connected to a positive terminal of the power source 7. Positional sensors $H_1$, $H_2$, $H_1'$ and $H_2'$ using a Hall devices are disposed in the slots 3f, 3h, 3b and 3d, respectively. The direct current switch $Tr_{11}$ is controlled by the positional sensor $H_1$, the direct current switch $Tr_{12}$ is controlled by the Hall device $H_1'$, the direct current switch $Tr_{21}$ is controlled by the positional sensor $H_2$, and the direct current switch $Tr_{22}$ is controlled by the positional sensor $H_2'$. A rotor 2A also is formed by a pair of magnetic poles. A ring shaped compensation magnet 2B comprises four pairs of magnetic poles disposed on a peripheral portion of the rotor 2A.

Figure 3:
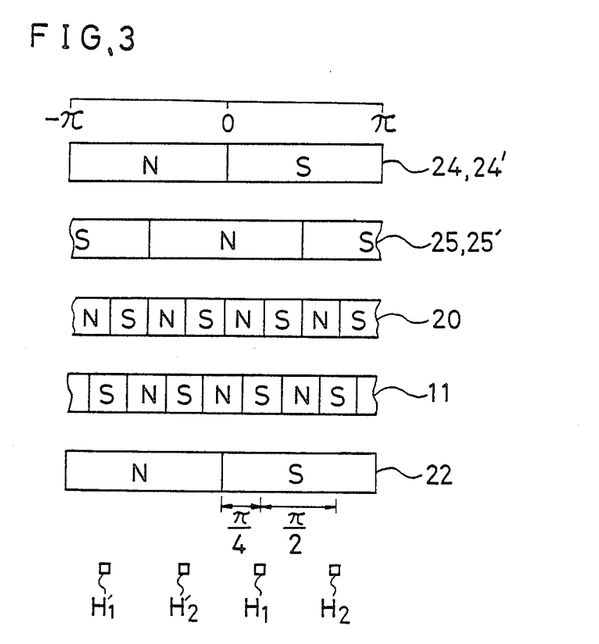
FIG. 3 shows the relative position of linearly spread magnetic poles of a stator and rotor and of positional sensors in the first embodiment.

Linearly spread magnetic poles of the brushless DC motor as shown in FIG. 2 are shown by FIG. 3. Since the current of compensation winding 10 is constant, its magnetic poles do not change.

When the rotor 2A rotates, a compensation torque $T_A$ which has a reverse phase with respect to the variation of sum torque T of $T_1$ and $T_2$ generated between the windings 8, 8', 9, 9' and the rotor 2A is generated. The relationship between the compensation torque and a main torque generated by the windings 8, 8', 9, 9' and the rotor 2A is discussed hereinafter. When the maximum value of the sum torque is 1 as a fundamental value in the current flowing for $\pi$ electric degrees and the current flowing for $\pi/2$ electric degrees, torque at a position where the current is switched is calculated by equation (2), and the value is given by the following equation:

$$\sin \pi/4 = 0.707,$$

Therefore, the compensation torque $T_A$ is given by the following equation:

$$\frac{1 - 0.707}{2} = 0.145.$$

As a result, the compensation torque $T_A$ in the current flow for $\pi/2$ electric degrees is shown by equation (4-1).

$$T_A = 0.145 \sin 4(\omega t - \pi/8) \qquad (4\text{-}1).$$

The compensation torque $T_A$ in the current flow for $\pi$ electric degrees is shown by the following equation (4-2).

$$T_A = -0.145 \sin 4(\omega t - \pi/8) \qquad (4\text{-}2).$$

In the embodiment, a torque due to mutual action between the compensation magnets 2B and the stator windings, or a torque due to mutual action between the rotor 2A and the compensation winding 10 is not generated because the number of poles thereof are different from each other.

The relationship between a maximum value $B_S$ of a magnetic flux distribution of the stator exciting windings and a maximum value $B_{SA}$ of the magnetic flux distribution of the compensation winding is obtained by equation (2), the relation being shown by the following equation:

$$nB_{SA}B_{RA} = 0.145 \, B_S B_R$$

$$n = 4, \quad (5)$$

where, $B_S$ designates a maximum value of the magnetizing distribution of the first stator winding, $B_R$ designates a maximum value of the magnetizing distribution of the magnetic pole of the rotor 2A, $B_{SA}$ designates a maximum value of the exciting distribution of the compensation winding and $B_{RA}$ designates a maximum value of the magnetizing distribution of the magnetic pole of the compensation magnet 2B.

For example, when the respective values are as follows: $0.3B_R = B_{RA}$, $B_S = 1$, $B_R = 1$ the values $V_{SA}$ may be obtained from equation (5) as shown by the following equation (6):

$$\left.\begin{array}{l} B_{SA} = 0.121 \\ \text{(current flow for } \pi/2 \text{ electric degrees)} \\ B_{SA} = 0.171 \\ \text{(current flow for } \pi \text{ electric degrees).} \end{array}\right\} \quad (6)$$

When the gap between the stator and the rotor is constant and magnetic reluctance is generated by only the gap, an ampere turn of the compensation winding is decided by equation (6). A ratio of the strength of the magnetic pole of the rotor 2A to that of the magnetic poles of the compensation magnet 2B is selected to be of a suitable value by selecting a ratio of both lengths along the axis, when both magnets have the same characteristics.

In the embodiment, since the stator is provided with the four pairs of magnetic poles generated by the compensation winding, the four pairs of magnetic poles are disposed on the rotor with a pitch of an electric angle of $\pi/8$ as the compensation magnets in the current flowing for $\pi/2$ electric degrees. In the current flowing for $\pi$ electric degrees, the four pairs of the magnets are disposed in a reverse polarity to that of the current flowing for $\pi/2$ electric degrees.

Figure 4:
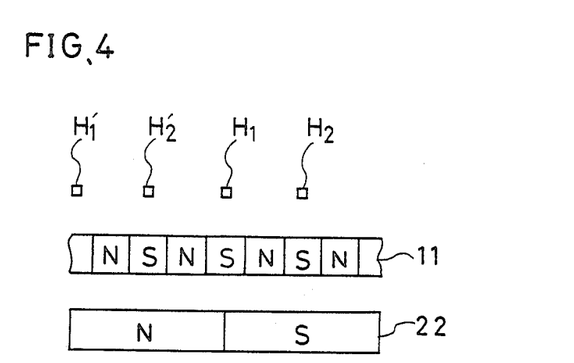
FIG. 4 shows the relative position of linearly spread magnetic poles of the rotor and compensation magnets and of the positional sensors in current flowing for electric degrees in the embodiment.

Relative positions between the magnetic poles 24, 24', 25 and 25' and the magnetic poles 20 of the compensation winding of the stator 1A, the magnetic poles 22 and 11 of the rotor 2A and 2B, respectively, and the positional sensors $H_1$, $H_1'$, $H_2$ and $H_2'$ in the current flow of $\pi/2$ electric degrees are shown in FIG. 3, while the relative positions of the magnetic poles of the rotor and the positional sensors in the current flow of $\pi$ electric degrees are shown in FIG. 4.

When a common magnet is used as the magnet of the rotor 2A and the compensation magnet 2B of the rotor, a magnetizing distribution is formed along the combined magnetic pole of the magnetizing distribution $B_R \sin \theta$ of the rotor and magnetizing distribution $\pm B_{RA} \sin 4(\theta + \pi/8)$ of the compensation magnet. The magnetizing distribution is given by the following expression:

$$B_R \sin \theta \pm B_{RA} \sin 4 \, (\theta + \pi/8) \quad (7),$$

where the plus sign is applied in the current flow for $\pi/2$ electric degrees, and the minus sign is applied in the current flow for $\pi$ electric degrees.

Figure 5:
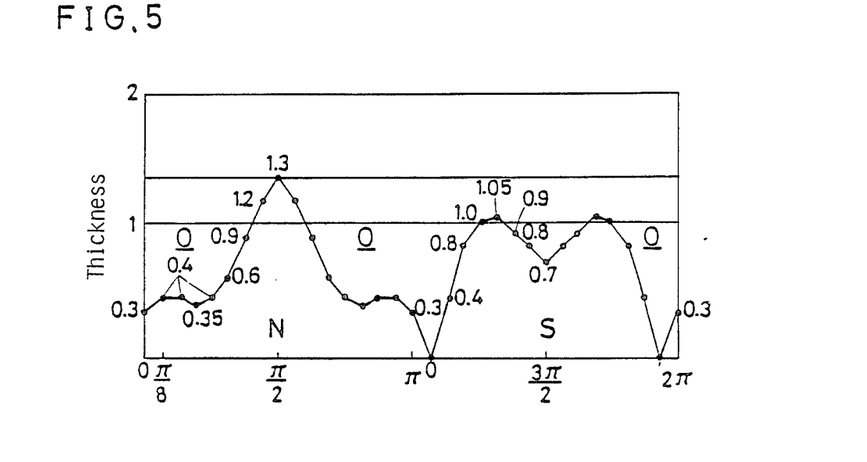
FIG. 5 shows a magnetization pattern of the rotor in the case of current flowing for $\pi/2$ electric degrees of the first embodiment.
Figure 6:
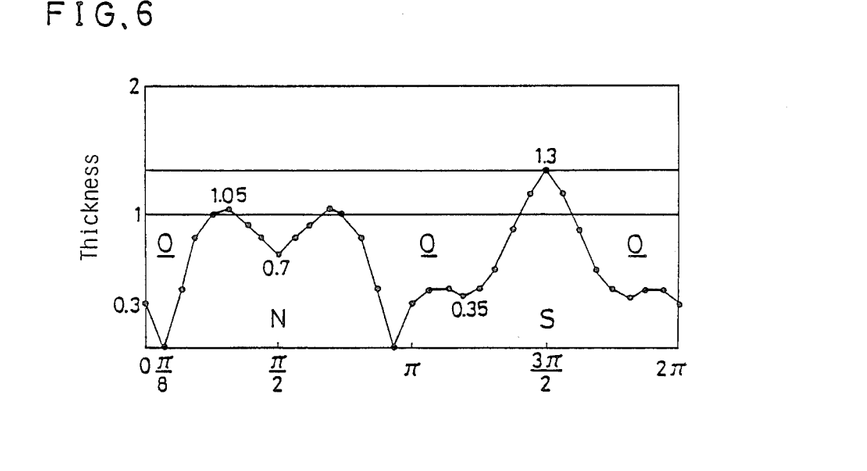
FIG. 6 shows a magnetization pattrn of the rotor in the case of current flowing for $\pi$ electric degrees of the first embodiment.

A magnetizing distribution plotted with an interval $\pi/16$ in the current flow for $\pi/2$ electric degrees is shown in FIG. 5 (a pattern of the magnetizing distribution of $B_R = 1$, $B_{RA} = 0.3$). A magnetizing distribution which is plotted with an interval $\pi/16$ in the current flow for $\pi$ electric degrees is shown in FIG. 6 (a pattern of the magnetizing distribution of $B_R = 1$, $B_{RA} = 0.3$). In these figures, a sign 0 shows zero magnetizing zones.

Figure 7A:
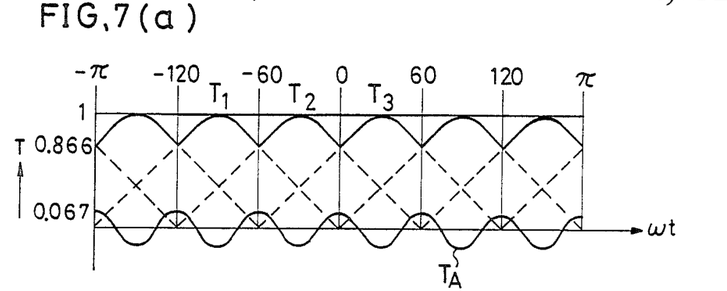
FIG. 7(a) shows torque characteristics in a three-phase brushless DC motor of a second embodiment in accordance with the present invention.

The torque characteristics in the case of a three phase brushless DC motor in the current flow for $\pi/3$ electric degrees is shown in FIG. 7(a). In the figure, curves $T_1$, $T_2$ and $T_3$ show torques of a first winding, a second winding and a third winding, respectively. A compensation torque $T_A$ is given by the following expression:

$$0.067 \sin 6 \, (\omega t + \pi/12).$$

Figure 7B:
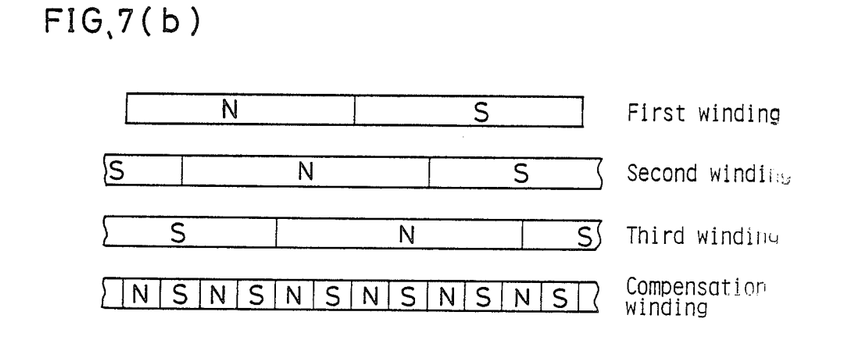
FIG. 7(b) shows the relative position of linearly spread magnetic poles of the three windings and the compensation winding of the second embodiment.
Figure 7C:
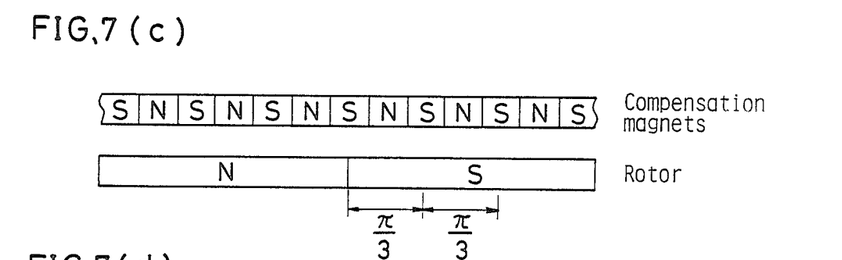
FIG. 7(c) shows the relative position of linearly spread magnetic poles of compensation magnets and a main rotor of the second embodiment.
Figure 7D:
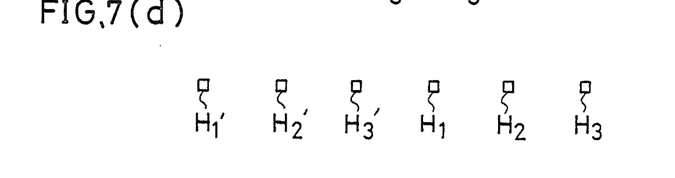
FIG. 7(d) shows the linearly spread positions of the positional sensors in the second embodiment.

Linearly spread magnetic poles of the first winding, the second winding, the third winding, a compensation winding, a compensation magnetic pole of the rotor and a magnetic pole of the rotor are shown in FIG. 7(b) and FIG. 7(c). Relative positions of the positional sensors for switching currents of the respective windings of the stator are shown in FIG. 7(d).

In a brushless DC motor having m (where m is a natural number) phase exciting windings, a compensation winding having magnetic poles as shown by an expression $2 \times (2m)$ is wound by superimposition on the exciting windings. The compensation winding then is excited by a constant DC current. The number of compensation magnetic poles of the rotor in the m-phase brushless DC motor is also $2 \times (2m)$.

Also, when a common magnet is used as the magnet of the rotor and the compensation magnets, the common magnet is magnetized in a magnetizing pattern to an axis direction of the rotor as shown by the following expression:

$$B_R \sin \theta + B_{RA} \sin [2 \times (2 \, m)\theta \pm \pi/2].$$

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A brushless DC motor for compensating ripple torque, comprising:
    a stator having exciting windings,
    a rotor having main magnetic poles opposing said exciting windings across an air gap,
    compensation magnetic poles disposed completely about the periphery of said rotor, and
    a compensation winding, opposing across said air gap said compensation magnetic poles disposed on said rotor, for generating a compensating torque having inverse phase and an identical cyclic period with respect to a variation of torque generated by interaction of said exciting windings and said main magnetic poles.

2. A brushless DC motor for compensating ripple torque in accordance with claim 1, wherein the ratio of ampere turns of said compensation winding to that of said exciting windings is selected to be ½ of a difference between a maximum generating torque due to said exciting windings and a special minimum torque generated by switching of current due to interaction of the main magnetic poles of said rotor and said exciting windings of said stator.

3. A brushless DC motor for compensating ripple torque in accordance with claim 1, wherein main magnets having said main magnetic poles and compensation magnets having said compensation magnetic poles of the rotor are disposed on a shaft so that the magnetic poles thereof are parallel to an axis of the shaft.

4. A brushless DC motor for compensating ripple torque in accordance with claim 3, wherein said main magnets and compensation magnets of the rotor are magnetized in one piece of magnetic substance.

5. A brushless DC motor for compensating ripple torque in accordance with claim 3, wherein said main magnets and compensating magnets are formed so that a resultant magnetizing pattern generating a magnetic field of said main magnets and compensating magnets is magnetized in one piece of magnetic substance.

* * * * *